United States Patent
Gudesen

[11] Patent Number: 6,088,319
[45] Date of Patent: Jul. 11, 2000

[54] METHOD FOR WRITING OF DATA IN AN OPTICAL MEMORY, APPARATUS FOR PERFORMING THE METHOD AND OPTICAL MEMORY FORMED THEREBY

[75] Inventor: Hans Gude Gudesen, Gamle Fredrikstad, Norway

[73] Assignee: Thin Film Electronics ASA, Oslo, Norway

[21] Appl. No.: 08/981,710

[22] PCT Filed: Jun. 24, 1996

[86] PCT No.: PCT/NO96/00154

§ 371 Date: Dec. 23, 1997

§ 102(e) Date: Dec. 23, 1997

[87] PCT Pub. No.: WO97/01165

PCT Pub. Date: Jan. 9, 1997

[30] Foreign Application Priority Data

Jun. 23, 1995 [NO] Norway ................................. 952545

[51] Int. Cl.[7] ........................................ G11B 3/74
[52] U.S. Cl. ............................ 369/97; 235/454; 235/488
[58] Field of Search ...................... 369/97, 96; 235/454, 235/456, 488, 494, 487

[56] References Cited

U.S. PATENT DOCUMENTS 4,818,852  4/1989  Haddock et al. ...................... 235/488
4,912,312  3/1990  Haddock .
4,957,580  9/1990  Drexler et al. ........................ 235/454

FOREIGN PATENT DOCUMENTS 2717000  11/1977  Germany .
2189926  11/1987  United Kingdom .

OTHER PUBLICATIONS

Patent Abstracts of Japan—JP-A-63-96746 —Apr. 27, 1988.

Chris Terry, "Flexible optical media boost data density" Apr. 25, 1999, pp 77–85.

*Primary Examiner*—Thang V. Tran

[57] ABSTRACT

In writing of optical data in an optical memory, the optical memory is linearly transported along a path past two or more physically separated write units. The two write units are provided at a distance from one another along the path and are mutually stepwise displaced in the path's transverse direction. The distance along the path separating write units is greater than a width of a preceding write unit. Each write unit is assigned to a section of the optical memory, with the result that the writing data is performed in the transport direction in separate and successive stages. Each stage contributes a fraction of the volume of information to be recorded during the writing.

20 Claims, 1 Drawing Sheet

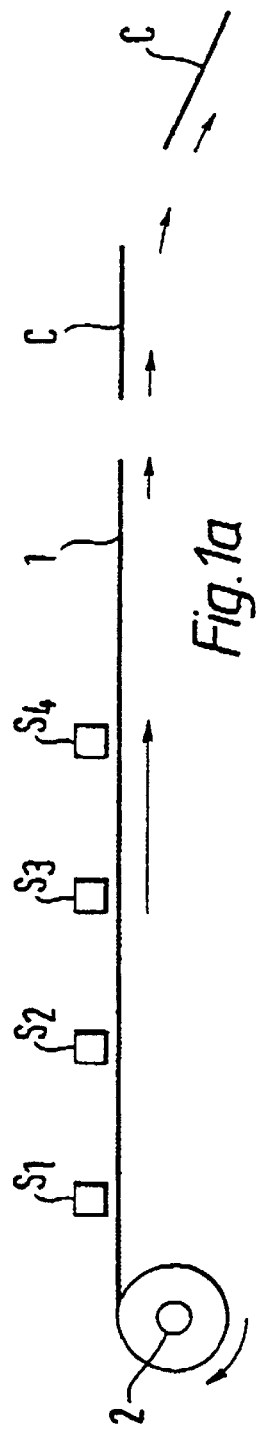
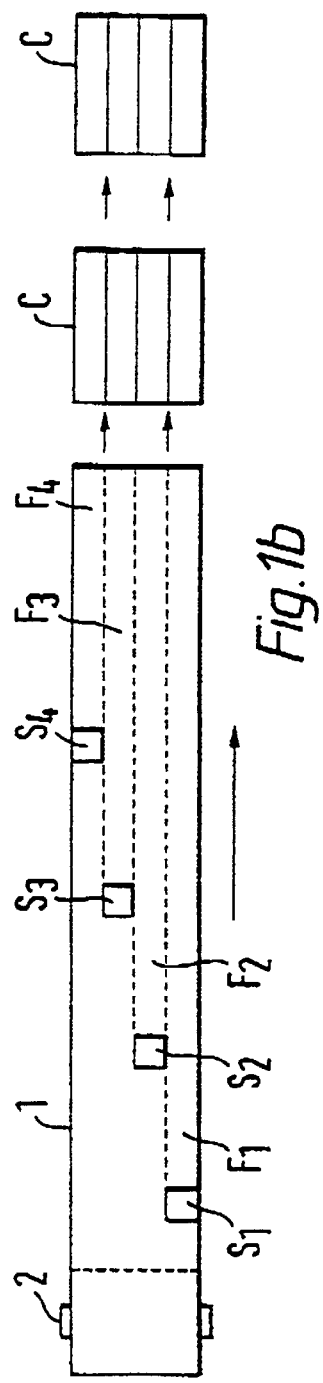
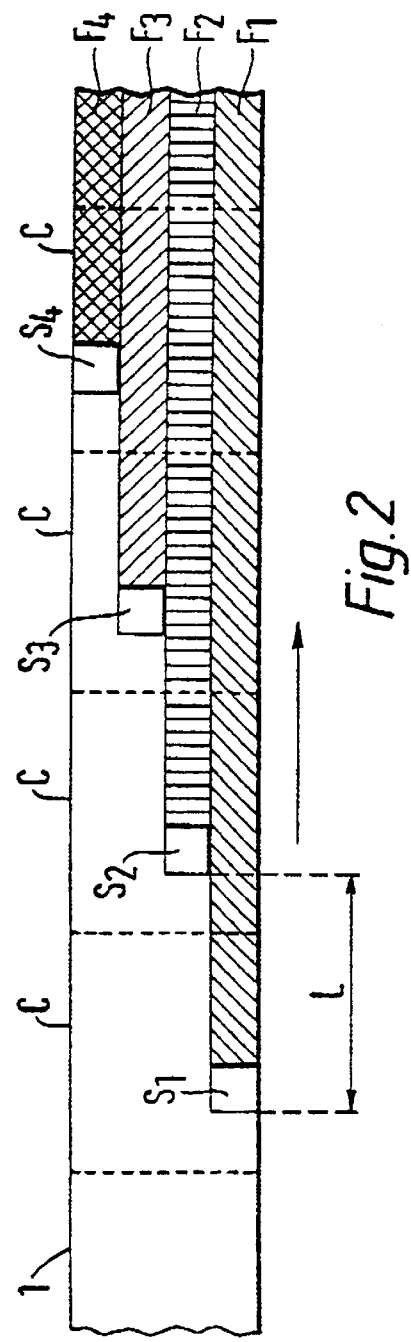

METHOD FOR WRITING OF DATA IN AN OPTICAL MEMORY, APPARATUS FOR PERFORMING THE METHOD AND OPTICAL MEMORY FORMED THEREBY

FIELD OF THE INVENTION

The invention concerns a method for stagewise sequential writing of data in an optical memory wherein two or more write units emit light pulses which cause localized changes in one or more light-sensitive layers in the optical memory, and wherein the optical memory is transported past the write unit in linear movement along a path.

The invention also concerns an apparatus for stagewise sequential writing of data in an optical memory and with two or more write units including one or more pulsating light sources which illuminate localized areas in one or more light-sensitive layers in the optical memory, and wherein the optical memory is transported past the write units in linear movement along a path.

Optical storage media for digital data in the form of discs or cards combine substantial storage capacity with portability, i.e. the medium can easily be removed from the write/read device for storage or for transfer to another write/read device. Spool tape can also be used for optical data storage and has a number of features in common with discs and cards, but can in addition store considerably more data.

In general the present invention concerns the storage of information on optical storage media with special emphasis on the possibility of producing a large number of copies from a master file which contains software, catalogs, music sources, video sources and the like.

More particularly, the method according to the present invention concerns the writing of data in optical media which may be in the form of a tape during a part of a production process where data are recorded in the medium. With this in mind, data storage media in the form of cards, e.g., have been manufactured in the form of a wide, thick tape on a spool and run through a number of processing stages which correspond to those which are employed on a continuous tape for optical data storage. After the final stage in the process, the tape is divided into separate cards. Even though the tape format entails a restriction which appears to exclude disc media, it is natural to refer to the latter, and this is done to some extent in the following.

DESCRIPTION OF RELATED ART

In principle all physical formats for a data storage medium can carry memory layers with very different properties. So-called read-only memories (ROM) represent a subclass of digital optical storage media which have been shown to be especially well suited to storage and distribution of professional data bases together with consumer-oriented material such as music, video games, reference works etc. In this subclass, data are stored once and for all and can subsequently be read out repeatedly. A typical example is the compact disc (CD) which is used amongst other things for playback of music. A similar, but more flexible type of media is that which is written once and read many times (WORM), where data can be written on the media by the user. As soon as the data are written in, they cannot be altered, but they can be read a number of times and a written medium of the WORM type is therefore rather similar to a ROM. Media which can be written, erased and written on again a great number of times are naturally more flexible.

Optical data storage media can offer a substantial storage capacity and also be easy to take out, transport and store for later use. However, with regard to commercial exploitation, e.g. mass distribution of music recordings, video recordings or similar types of information, there is also a requirement that there should be the possibility of transferring large volumes of data from a master source to individual relevant optical media, for example a disc, tape or card, and in a cost-effective manner. Two fundamentally different methods are known for prerecording data. Firstly, data can be entered into the medium as an inherent part of the actual manufacturing process for the medium. Examples of this are punching or injection moulding of the pit pattern during the manufacture of so-called CD ROM's, and photographic exposure and subsequent chemical development of photo-sensitive emulsions, e.g. optical cards which are produced by Drexler Technology Co., Palo Alto, Calif., USA.

The first method is well-established and has long been commercially exploited. With regard to the second method, unwritten media offer the user great flexibility and eliminate the need for batchwise production of different versions of stored material, but represent a formidable challenge for the data transfer, since large volumes of data have to be written on each initially unwritten medium at a rate and a cost which for important applications must be able to approach the cheap, high-yield methods which are employed at present in the manufacture of CD ROM's. For example, a production line for compact discs delivers one disc approximately every ten seconds. With a storage capacity on the disc of, e.g., 600 Mbyte data, this means an average transfer rate of 60 Mbyte/s. This substantially exceeds the write/read rates which can be achieved by to-day's software, where the maximum read rates for rapidly rotating, parallel track equipment with a plurality of heads are specified to be around 12 Mbyte/s (Laser Focus World, page 64, August 1993). The write rates are probably much lower than this.

Data transfer to known optical storage media based on cards, including that offered by the companies Canon, Drexler Technology Inc. and their licensees, by means of a laser write beam is several orders of magnitude slower than this. These cards have capacities which are well under 10 Mbyte, but the slow write rates are still a bottleneck with regard to copying, especially due to the low effective speed which can be obtained with this forward and backward scanning movement of the laser write beam relative to the card. For example, in GB-A-2 189 926 (Drexler et al.) there is disclosed an optical storage medium in tape form which is attached to a card base, and which is wound up on a spool and which also has a continuous pattern of parallel, separated and pre-described servo tracks over the entire length of the tape. The tape can be wound on and off by driven transport spools, while data are recorded on the tape by a laser-based write/read device. A system with cards mounted on a drum is known from U.S. Pat. No. 4,912,312 (Haddock), where the forward and backward movement is avoided. However, placing cards on a drum and retrieval thereof after the writing appears impractical with regard to production at high speed and high volume. Haddock also appears to only involve the use of a single laser write beam.

Further it can be mentioned that optical tape systems for writing and reading between the spools have been developed (C. Terry, "Digital-paper storage: Flexible optical media boost data density", Electronic Design News, page 77, Apr. 25, 1991). The two systems for writing and reading which have been described do not appear to be suited to cheap, high-speed recording of data with a view to distribution of, e.g., music recordings and video recordings. One system involves the recording of a large number, e.g. 32, of parallel tracks across the width of the tape. The tape is stationary during this sequence and moves rapidly forward one step for the next sequence. In a second system a single laser beam is scanned across the width of the tape, while the latter moves in such a manner that a diagonally described track is obtained. Parallel tracks over an area are produced by a number of passes, which in turn requires the tape to be spooled a number of times.

For both these systems the data transfer rate is given as 3 Mbyte/s and can be upgraded to 12 Mbytes/s.

Finally there is from JP patent application JP-A-63096746 known an optical recording system and optical recording medium comprising belt-shaped recording areas extending along the length of the optical recording medium and having a considerably narrow width. Each of the recording areas is formed with recording tracks extending transversely over the width direction thereof and thus having a length of a considerably small value. The optical heads record data by modulating a beam of light which scans across the short transversal tracks and in consequence the range of the deflection angle of the optical beam can be considerably reduced and this make possible an improvement in the accuracy in condensing the optical beam. Nothing is however said of any improvement in the recording speed and this optical recording system does not appear suited to stagewise sequential writing of e.g. card-shaped optical memories initially assembled as a continuous moving tape or provided on a tape of this kind for high-speed recording of data.

SUMMARY OF THE INVENTION

An object of the present invention is therefore to avoid the above-mentioned drawbacks when transferring data at high speed for copying or production of a large number of data-carrying media from an individual master medium, while at the same time avoiding the disadvantages of the above-mentioned prior art.

A further object is especially to be able to transfer data to storage media which are physically formatted as cards or tapes. During the writing process the cards should be joined to form a continuous tape, but could be divided into individual cards after the writing sequence has ceased.

In specific terms, therefore, an object of the present invention is to specify a method for writing of data at high speed on tape or card-like storage media, an apparatus for performing the method and an optical medium organized in such a fashion.

The above-mentioned and other objects are achieved according to the invention with a method including providing two or more write units at a distance from one another and mutually stepwise displaced in the path's transverse direction, with the result that a write unit is assigned to a section of the optical memory, providing the optical memory with physically separated fields for writing at each stage, each field substantially corresponding to the section of the optical memory assigned to a write unit, writing the data in the transport direction in separate and successive stages respectively, and writing at each stage a fraction of the volume of information which are to be recorded during the writing, the fraction substantially being proportional to the inverse of the number of write units; an apparatus two or more write units provided at a distance from one another and mutually stepwise displaced in the path's transverse direction. A write unit is assigned to a section of the optical memory. The distance between each write unit is substantially equal and corresponding to the length of the section of the optical memory assigned to a write unit. As a result, data are written in the transport direction in separate and successive stages, each stage contributing a fraction of the volume of information which are to be recorded during the writing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF PREFERRED EMBODIMENT

The invention will now be described in more detail in connection with embodiments, fundamental principles and the possibilities and capacities which thereby can be realized, and with reference to the accompanying drawing, in which:

FIG. 1a illustrates schematically a device for parallel writing on a tape consisting of connected cards and viewed from the side, FIG. 1b is the same viewed from above, and FIG. 2 illustrates how the optical data storage medium is organized with memory areas on a card and each card connected to form a continuous tape with sequentially and successively provided write units.

DETAILED DESCRIPTION OF THE PREFERRED EMBODIMENTS

FIGS. 1a and 1b schematically illustrate an apparatus for writing of data in an optical memory and according to the present invention. The actual data storage medium is in the form of a tape 1 which is wound off a storage spool 2 and transported past a number of regularly spaced write units 5, illustrated here as units $S_1$, $S_2$, $S_3$, $S_4$. The write units are spaced from one another both in the longitudinal direction along the path and stepwise in the traverse direction of the path, as most clearly seen in FIG. 1b. As can be seen in both FIGS. 1a and 1b, the separation of a preceding write unit and a succeeding write unit in the longitudinal direction is greater than the width of the preceding write unit, i.e., the write units do not touch one another. If the tape 1 is composed of cards C or has to be divided up into cards after the end of the write sequence, the distance between each write unit S can correspond to the length of an individual card. After the end of the write sequence the tape is cut up into cards C, if this is the preferred, final data storage medium.

The use of the tape format as illustrated in FIGS. 1a and 1b opens up new possibilities for parallelism in writing of data by laser. The number of laser units which can work simultaneously on a single disc or a single card is in fact extremely limited due to the space requirements. A medium in the form of a tape permits the number of write units to be increased arbitrarily, provided that the tape is long enough. This is illustrated more clearly in FIG. 2, which shows the tape 1 viewed from above and divided into preferred equally large cards C which, when assembled, form the tape. The optical memory area on each card is divided into N fields F, illustrated here as four fields $F_1$, $F_2$, $F_3$, $F_4$ which extend in the tape's direction of travel. N is also the number of write units S which are employed along the tape 1 before it is divided into cards. In FIG. 2, N=4. When the card C enters the first write unit $S_1$, data are written which cover a track width corresponding to memory field $F_1$. At the next write unit memory field $F_2$ is written and so on until all the memory fields $F_1$, $F_2$, $F_3$, $F_4$ have been written. If the write speed is R byte/s, the effective write speed for N units will be NR bytes/s. Given a measured value for NR, the size of N will be the write speed R for every unit S.

An indication will now be given of possible realistic values for the number of memory fields F on the assumption that the actual system, i.e. the maximum permissible length of the tape 1 which can be written simultaneously with N units S is given. Each write unit S occupies a length L, including the required distance between each write unit and the next along the tape's direction of travel, i.e. that the total write operation occupies a length NL. At present, the length L is assumed to be between 3 and 20 cm depending on technical factor and costs. Assuming that the possible length for the data transfer section, i.e. the write area in a production line, e.g., is 5 m and L=15 cm, it is found that N=500/15=33. Compared to production lines for other types of cards joined to form tapes, a length of 5 m for a given write operation is not excessive and the total distance between the beginning and the end of a multi-operation production line can very well be 20 m or more. If the tape is composed of cards of, e.g., 10 cm, 200 cards will constitute a distance of 20 m between the storage spool and a recording spool or the cutting point. The capacity of the storage spool 2 is expected to be many thousands of cards.

The writing process too can be subject to certain restrictions which have consequences for the number N of memory fields F. Each write unit S covers a field F with limited width on the tape 1. Moreover, when writing by laser, each field F must be able to be written without overlapping of other fields. The positioning of each field F with regard to adjacent fields can be a difficult task and an increase in the number of fields F in the write units S increases the system's total complexity. The effect on the optimum choice of number of memory fields F cannot be described in general terms, but must consider take into account explicit tasks concerning each individual embodiment. Each write unit S includes a detector which guides the write beam, as is well known in the art. Depending on the medium employed it can be practical to write each field F in direct continuation of its neighbouring field, i.e. without any intervening break. Known data storage media with predetermined data positions, e.g. based on the use of spherical microlenses, can, e.g., be especially relevant in this context. Alternatively the positioning can be made less critical by having a gap between the field boundaries, either physically pre-formed on the tape 1, or software-controlled as a part of the writing process. If the number N of fields F is large, the number of gaps constitutes a proportionally large area which cannot be used for storing data. If each gap, for example, is 50 $\mu$m and at most 3% of the effective memory area width of, for example, 50 mm is lost in the gaps, this means that N=0.03·50000/50=30. If the cards are connected together to form a tape with the side of the card along the tape's direction of travel, the effective memory area can, for example, amount to 100 mm, and N=30 would then only entail a loss of 1.5% of the effective memory area.

The present invention is expected to be able to provide write speeds which are at least as good as or much better than write speeds with the use of known media. The use of a single laser beam for writing on a rotating disc medium gives up to 1 Mbyte/s in currently available commercial desktop equipment. However, in production conditions, lasers and control systems can be used which can substantially increase the writing speeds. For example, high beam deflection rates can be achieved acoustically, and there are indications that 3 Mbyte/s can be achieved with the "Laser-tape" system which employs a single beam. It is indicated in the literature that addressable laser groups (VCSEL) and positionable lasers offer the possibility of parallel writing on a large scale. The same can be achieved with spatial light modulators (SLM) combined with a light source. Also known are directly writable optical memory systems based on electron trap technology, such as "ETOM" from the Optex Corporation in USA and which is at an advanced stage of development and is stated to give transfer rates of 15 Mbyte/s or more by means of grey scale coding.

In the present invention, assuming a write rate for each write unit S in the range 1–10 Mbyte/s, it is possible to achieve a write rate with N units S in the range from N Mbyte/s–10 N Mbyte/s. A number of memory fields N of 30 was found to be compatible with those criteria which were described in the previous paragraph. If a more conservative value is selected, for example N=10, the write rate when using the method according to the present invention will be 10–100 Mbyte/s.

It will be possible to combine the optical memory which is employed by the method according to the present invention with spherical microlenses which can be addressed simultaneously by means of a laser cluster. On the basis of prior art the data transfer rate can be written as:

$$R = nv/8 \; d \; \text{byte/s} \qquad (1)$$

where n is the effective number of data point positions under each microlens at the effective scanning rate for the laser system which reads or writes on the medium, and d is the diameter of the sphere. With d=10 $\mu$m and n=494 the following is obtained:

$$R = 6 \; v \; \text{Mbyte/s, v being expressed in m/s.} \qquad (2)$$

The effective scanning rate v should be maximized in order to achieve high speed. Two different methods will now be described.

The first method moves the optical write head physically in a forward and backward movement. This is a slow operation, since commercial optical card readers normally work at a speed of 0.5–1 m/s. With microlens-based storage media, the laser system will not need to scan at a constant speed.

A second possible method includes moving the beam by means of an optical element. This can achieve a high speed by acoustooptical means, but the strong convergence of the beam makes this difficult. However, the short length of stroke, for example a few mm for high values of N, simplifies the situation and displacement of the beam by means of movable optical elements can thereby be implemented.

A numerical example will illustrate this. Assuming a speed v in the range 0.5–10/s gives according to formula (2): R=3–60 Mbyte/s. This applies to each individual write unit S. If, for example, 10 write units S are provided, the write rate for the entire system will be 30–600 Mbyte/s.

In the method according to the present invention an apparatus is employed according to the invention which also divides the writing process between a number of cooperating, but independent write units S based on the assumption that each individual write unit can write at a speed which is not much less than that of a single, large write unit. It is well known, however, that there are certain mechanical restrictions on the maximum achievable scanning rate for a write beam relative to the data storage medium. For example the rotation speeds for recent optical disc stores have been substantially increased in order to increase the data transfer rates. In this case, mechanical restricting factors will arise in the form of vibrations due to unevenness in the disc or a decentralized disc mass and acceleration and deceleration effects when files with different radii have to be accessed at high speed. Systems which write in straight lines are more relevant in this connection, since a distinction can be made here between scanners which provide a smooth continuous movement, e.g. based on rotating prisms, or which have no mechanical movement at all, e.g. acoustooptical deflectors, and those in which a mass is rapidly accelerated or decelerated, e.g. in a forward and backward movement. The latter case is the most critical, as a number of restricting phenomena will occur, such as vibrations which reduce the tracking accuracy, power consumption, unit costs and unit size, etc. Maximum acceleration during the scanning cycle is a main parameter, but it can be effectively reduced by employing a plurality of write units as in the method and the apparatus according to the present invention.

In the case of a harmonic oscillating movement, the effective write speed can be increased N times by employing N smaller units instead of one large write unit, thus obtaining a maximum acceleration which is scaled in relation to N. A corresponding increase in speed with a single large unit will lead to a maximum acceleration which is scaled by the square of N.

Otherwise it is well known that both acquisition and tracking problems arise at high speeds. As the speeds increase, increasing demands are also made on a number of links in the chain which involve detection, logic and power for controlling the beam position. By dividing a write unit S into N smaller units $S_1, S_2, S_3, S_4$ as in the present invention, an increase of a factor of N is obtained in the time which is available for each individual sub-task, without any reduction in the total write speed.

When writing in optical storage media there are also physical restrictions with regard to the size of a so-called bit point in the medium, i.e. an area where a single bit has to be stored. A certain amount of energy must be supplied to the central area with an intensity which is above the threshold which is necessary for registration of the single bit to take place. In practice, however, the light beam is not stopped at each write point in the medium, but the duration of the write pulse is so short that the scanning movement is virtually effectively "frozen" during the writing of each bit point. As the bit points become smaller in order to achieve higher storage density and the scanning rate is increased in order to give higher transfer rates, a point is reached where the movement is no longer "frozen" to a sufficient extent. With a scanning rate of 10 m/s the beam moves $10^7 \cdot 10^{-7}$ $\mu$m=1 $\mu$m in the course of 100 ns, which is far above what is permissible for a high-density storage medium. It should be noted, however, that optical data storage media based on spherical microlenses are less vulnerable in this respect. A reduction in the pulse duration will avert the problem, but another problem may arise, viz. that it will be difficult to supply sufficient energy in the time which is available. This in turn leads to higher laser output and higher costs. Independently of this, simultaneous reading and writing in order to control the actual writing process, e.g. and to achieve a greater degree of reliability or control of grey scale coding, will become more difficult and more expensive as the time which is available for writing in each bit point position is reduced. By employing a method according to the invention where the writing of the data is performed separately and in successive stages by means of two or more write units and by means of an apparatus which performs such a method, the combination of high write speed, adequate process quality and small diameter, i.e. high energy in the write point, in other words high storage density and high data transfer rates, can still be achieved without the problems which are present in the current prior art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method for recording data in an optical memory having at least one light-sensitive layer, the method comprising:

providing at least two write units ($S_1, S_2 \ldots$) at a distance from one another along a travel path and mutually stepwise displaced in a direction transverse to the travel path, each write unit (S) being assigned to a section of the optical memory;

transporting the optical memory past the at least two write units in linear movement along the travel path;

providing the optical memory with at least two physically separated fields (F) of substantially equal length for writing at each stage, each field ($F_1, F_2 \ldots$) substantially corresponding to the section of the optical memory assigned to a respective write unit ($S_1, S_2 \ldots$); and writing the data in the direction of the transport path in separate and successive stages respectively, the writing including writing, at each stage, a fraction of the data which are to be recorded, the fraction substantially being proportional to an inverse of a number of write units ($S_1, S_2 \ldots$);

said write units being each spaced, in the direction of the travel path, from adjacent write units, by a distance substantially equal to the spacing of plural optical memories along said travel path.

2. A method according to claim 1, wherein, during the writing, the optical memory forms a continuous tape.

3. A method according to claim 1, wherein, during the writing, the optical memory is in the form of one of a foil and a card (C) which is physically connected to other foils or cards (C), respectively, thereby forming a continuous tape during the writing, the foils or cards (C) being separated after the cessation of writing.

4. A method according to claim 1, further comprising attaching one or a foil and a card (C) serving as the optical memory to a tape and transporting the foil or card on the tape during writing.

5. A method according to claim 3, wherein an upper limit on the length of each field ($F_1, F_2 \ldots$) is the length of the foil or card (C).

6. A method according to claim 1, further comprising providing the optical memory with at least one optically readable positioning mark for writing at each stage.

7. A method according to claim 6, further comprising providing the at least one positioning mark at a first stage of the writing.

8. A method according to claim 6, further comprising providing positioning marks sequentially during each stage of the writing.

9. An apparatus for stagewise sequential writing of data in an optical having at least one light-sensitive layer, the apparatus comprising:

at least two write units (S$_1$, S$_2$ ... ), each write unit including at least one pulsating light source for illuminating localized areas in a corresponding light-sensitive layer in the optical memory;

a transporter for transporting the optical memory past the write units in linear movement along a travel path, said at least two write units (S$_1$, S$_2$ ... ) being provided at a distance from one another along the travel path and mutually stepwise displaced in the transverse direction of the travel path, and each write unit (S) being assigned to a section of the optical memory, a distance between a preceding write unit and a succeeding write unit along the path being greater than a width of the preceding write unit, thereby writing data in a transport direction in separate and successive stages, each stage contributing a fraction of the data to be recorded.

10. An apparatus according to claim 9, wherein the distance between the preceding write unit and the succeeding write unit for all of the at least two write units is substantially equal and corresponds to a length of the section of the optical memory assigned to a write unit.

11. An apparatus according to claim 9, wherein the fraction of data written at each stage is substantially proportional to an inverse of a number of write units.

12. A method for recording data in an optical memory having at least one light-sensitive layer, the method comprising:

providing at least two write units (S$_1$, S$_2$ ... ) at a distance from one another along a travel path and mutually stepwise displaced in a direction transverse to the travel path, each write unit (S) being assigned to a section of the optical memory;

transporting the optical memory past the at least two write units in linear movement along the travel path;

providing the optical memory with at least two physically separated fields (F) of substantially equal length for writing at each stage, each field (F$_1$, F$_2$ ... ) substantially corresponding to the section of the optical memory assigned to a respective write unit (S$_1$, S$_2$ ... ); and writing the data in the direction of the transport path in separate and successive stages respectively, the writing including writing, at each stage, a fraction of the data which are to be recorded, the fraction substantially being proportional to an inverse of a number of write units (S$_1$, S$_2$ ... );

said step of providing further including spacing each write unit from adjacent write units such that the distance between a preceding write unit and a succeeding write unit along the path is greater than a width of the preceding write unit.

13. A method of stagewise sequential writing of data to an optical memory, the optical memory being formed as a memory card with a length dimension comprising:

a) transporting a web of optical memory material along a transport path;

b) providing plural write units that emit light pulses to cause localized changes in at least one light sensitive layer of the optical memory material, each having a width dimension transverse to said transport path, including, i) locating said plural write units along said transport path at a spacing substantially equal to the length dimension of the memory cards in the direction of said transport path, each of said plural write units further being offset from the other said plural write units by an offset dimension substantially equal to the width of the field recorded by a single write unit;

c) writing data to said optical memory material when said optical memory material passes across said write units, said web of optical memory material being divided into individual memory cards having a length extending parallel to said transport path, each said write unit thereby writing a fraction of the total data recorded on a single memory card;

said step c) of writing thereby writing a portion of the data on each data card equal to the inverse of the number of said plural write units.

14. The method of claim 13 wherein said web of optical memory material is a continuous tape.

15. The method of claim 13 wherein said web of optical memory material is a continuous web of physically connected foils or cards separated after writing to form individual memory cards.

16. The method of claim 15 wherein individual foils or cards are attached to a tape to form said web of optical memory material.

17. The method of claim 13 wherein spacing of said write units along the transport path is substantially equal to the length of the information field recorded for a single memory card.

18. The method of claim 13 wherein said web includes one or more optically readable positioning marks to identify the beginning of successive fields.

19. The method of claim 13 wherein said positioning marks are provided to signal the beginning of writing.

20. The method of claim 19 wherein said positioning marks are provided to signal the beginning of each of said successive stages of writing.

* * * * *